United States Patent
Johnson et al.

(10) Patent No.: US 12,024,641 B2
(45) Date of Patent: Jul. 2, 2024

(54) KIT OF PARTS FOR STAINING WOODEN SUBSTRATES

(71) Applicant: Akzo Nobel Coatings International B.V., Amsterdam (NL)

(72) Inventors: Stephen Edward Johnson, Eagle Rock, VA (US); Heath G. Saunders, Roanoke, VA (US); F. Brent Neal, Greensboro, NC (US)

(73) Assignee: Akzo Nobel Coatings International B.V. (NL)

( * ) Notice: Subject to any disclaimer, the term of this patent is extended or adjusted under 35 U.S.C. 154(b) by 159 days.

(21) Appl. No.: 17/630,374

(22) PCT Filed: Jul. 28, 2020

(86) PCT No.: PCT/EP2020/071191
§ 371 (c)(1),
(2) Date: Jan. 26, 2022

(87) PCT Pub. No.: WO2021/018860
PCT Pub. Date: Feb. 4, 2021

(65) Prior Publication Data
US 2022/0289997 A1    Sep. 15, 2022

Related U.S. Application Data

(60) Provisional application No. 62/880,302, filed on Jul. 30, 2019.

(30) Foreign Application Priority Data

Aug. 22, 2019  (EP) ..................................... 19193169

(51) Int. Cl.
| | | |
|---|---|---|
| C09D 15/00 | (2006.01) | |
| B05D 1/36 | (2006.01) | |
| B05D 1/38 | (2006.01) | |
| B05D 7/06 | (2006.01) | |
| B27K 3/00 | (2006.01) | |
| B27K 3/34 | (2006.01) | |
| B27K 5/02 | (2006.01) | |

(52) U.S. Cl.
CPC .............. *C09D 15/00* (2013.01); *B05D 1/36* (2013.01); *B05D 1/38* (2013.01); *B05D 7/06* (2013.01); *B27K 3/005* (2013.01); *B27K 3/34* (2013.01); *B27K 5/02* (2013.01); *B05D 2203/20* (2013.01)

(58) Field of Classification Search
CPC . B27K 5/02; C09D 15/00; B05D 1/36; B05D 1/38; B05D 7/06; B05D 2203/20
USPC .................................. 106/34; 427/402, 408
See application file for complete search history.

(56) References Cited

U.S. PATENT DOCUMENTS

| | | | |
|---|---|---|---|
| 3,069,290 A | 12/1962 | Berry | |
| 4,814,016 A | 3/1989 | Adkins et al. | |
| 2008/0160202 A1* | 7/2008 | Reuter | C09D 15/00 427/407.1 |
| 2010/0048787 A1* | 2/2010 | Shapiro | C09D 167/08 524/376 |

FOREIGN PATENT DOCUMENTS

| | | |
|---|---|---|
| CN | 1063059 A | 7/1992 |
| CN | 1673189 A | 9/2005 |
| CN | 102528869 A | 7/2012 |
| CN | 104959292 A | 10/2015 |
| CN | 105170430 A | 12/2015 |
| CN | 107778997 A | 3/2018 |
| RU | 2672484 C1 | 11/2018 |
| WO | WO-98/54398 A1 | 12/1998 |
| WO | WO-2008/085431 A2 | 7/2008 |

OTHER PUBLICATIONS

Abstract of CN-104959292A.
Abstract of CN-105170430A.
Handbuch Fur Das Beizmischsystem, Hessse GmBH & Co. KG, Manual for the BMS Stain Mixing System, Solvent Stains—Hydro Stains—Wiping Stains, Verson 2. Aug. 2017. pp. 1-45.
Franco Bulian, et al., Wood Coatings:Theory and Practice, Elsevier, First Edition, 2009, pp. 1-165.
European Search Report of Corresponding Application No. EP 19193169.0, dated Feb. 19, 2020.
International Search Report and Written Opinion of Corresponding Application No. PCT/EP2020/071191, dated Nov. 20, 2020.
Englilsh Translation of CN1063059A.
English Translation of CN1673189A.
English Translation of CN102528869A.
English Translation of CN107778997A.
English Translation of RU2672484C1.

* cited by examiner

*Primary Examiner* — William P Fletcher, III

(57) ABSTRACT

A kit of parts is provided, comprising: in one part a) a water-borne stain; and, in another part b) a water-immiscible organic solvent-borne stain, wherein said water-borne stain is essentially free of resin and further contains at least one water-miscible organic solvent. Additionally, a method of coloring a wooden substrate is described, comprising the steps of: a) applying a water-borne stain to a surface of the wooden substrate, wherein the water-borne stain is essentially free of resin and comprises at least one water-miscible organic solvent; and thereafter b) applying a water-immiscible organic solvent-borne stain to said surface.

15 Claims, No Drawings

KIT OF PARTS FOR STAINING WOODEN SUBSTRATES

CROSS-REFERENCE TO RELATED APPLICATIONS

This application is a 35 U.S.C. § 371 national phase application of PCT Application No. PCT/EP2020/071191 (WO 2021/018860 A), filed on Jul. 28, 2020, which claims the benefit of priority to EP Application No. 19183999.2, filed on Jul. 2, 2019, each of which is incorporated herein by reference in its entirety.

FIELD OF THE INVENTION

The present invention is directed to the staining of wooden substrates. More particularly, the present invention is directed to a hybrid staining system comprising both an aqueous stain and an organic solvent-borne stain.

The staining of wood has the primary function of changing its color. Staining may also serve to intensify or diminish the grain of the wood, depending on the wood species, grain figure and type of stain used.

A variety of water-based or water-borne coatings are available in the prior art. For example, U.S. Pat. No. 4,814,016 (The Clorox Company) describes a water-borne penetrating coating composition and method for wood surfaces, said composition comprising a resin component comprising two maleinized linseed oils of different molecular weight, an alkyd resin, and a solvent comprising water and propylene glycol tertiary butyl ether as a coupling solvent.

Broadly, the two most common coloring agents in stain are pigments and dyes. The former are discrete colorant particulates suspended in a carrier. The latter are colorants which are dissolved in an appropriate solvent. The dissociated molecules and salts of dyes are vastly smaller than pigment particles and can therefore ingress into spaces that the pigment may not.

In practice, where a typical pigment stain is applied to dense, figured maple, most of the stain will wipe right off with little color change: if dye stain is applied, intense coloration and grain contrast can be attained. Conversely with oak—a wood characterized by large pores—the opposite is true: pigment particles present in a dispersion become lodged in the pores, creating contrast, while dyes color it with boring uniformity. Thus, dye is effective for adding intense color to dense wood, whether for grain enhancement or simple color change, but pigment is effective in bringing out the grain pattern in large pore woods.

To mitigate the disadvantages of each type of coloring agent for given woods, certain authors have sought to employ hybrid staining systems, whereby stains based on each of the different coloring agents—dispersed in either aqueous or non-aqueous carriers—are applied sequentially to a wooden substrate.

WO2008/085431 (Sherwin Williams) describes a multicoat system for staining a substrate, including wooden substrates, which system comprises: (a) a first coat comprising a non-aqueous pretreatment composition; and, (b) a second coat comprising an aqueous stain composition, wherein the non-aqueous pretreatment composition comprises a carbohydrate-based alkyd having pendent fatty acid residues.

CN 104959292 A (Guandong Langfarbe New Materials Technology Co. Ltd) describes a method of coating woodware comprising the steps of: i) spraying a water-borne coating of controlled viscosity onto the surface of the woodware to form a first coating; ii) drying the first coating for from 2 to 3 hours; iii) spraying a transparent primer onto the surface of the first coating to form a first primer layer, iv) drying the primer layer for from 2 to 3 hours; iv) spraying color paste on the surface of the first coating to form a color paste layer; v) spraying transparent primer onto the surface of the color paste layer to form a second transparent primer layer; vi) drying the primer layer for from 2 to 3 hours; and, vii) spraying a transparent finishing coat onto the surface of the transparent primer of the color paste layer.

CN105170430 A (Guandong Langfarbe New Materials Technology Co. Ltd) describes a method of coating wooden ware with a silver and/or gold finish, said method comprising the steps of: i) spraying a water-borne transparent primer to the surface of wooden ware, conducting drying and forming a transparent primer layer; ii) spraying a water-borne colored primer to the surface of the transparent primer layer, conducting drying and forming a colored primer layer; iii) spraying a water-borne colored finish paint to the surface of the colored primer layer to form a first finish paint layer; iv) mixing pearl powder and metal powder and smearing said mixture onto the first finish paint layer to color wood grains before the first finish paint layer is dried; and, v) spraying water-borne transparent finish paint to the surface of the first finish paint layer, conducting drying to form a second finish paint layer.

It is submitted that these hybrid stain formulations would achieve a rich enough color depth only through labor intensive methods and can require long finishing times. In addition to the plurality of steps mentioned above, it is considered that the application of the stain formulations will require intensive wiping, and thus concomitantly will have high labor, time and material costs: they would not ameliorate a common disadvantage of most known staining processes.

WO9854398 (Auger) describes an alternative solution wherein pre-cursors to particulate coloring agents are applied in solution: a metal salt and an oxygen source penetrate or impregnate a suitable substrate—including cellulosic substrates—sequentially in effective amounts so as to react in situ within the substrate and produce a mineral compound immobilized within the surface of the substrate. The citation discloses the use of peroxide compounds as the oxygen source: such compounds can however promote discoloration (lightening) of wooden substrates.

The present invention seeks to provide an alternative means of staining a wooden substrate which does not present the disadvantages exhibited by the known prior art.

STATEMENT OF THE INVENTION

In accordance with a first aspect of the present disclosure there is provided a kit of parts comprising:
  in one part a) a water-borne stain; and,
  in another part b) a water-immiscible organic solvent-borne stain,
wherein said water-borne stain a) is essentially free of resin and also contains at least one water-miscible organic solvent. The amount of said water-miscible organic solvent is preferably in the range of from 20 to 80 wt. %, based on the weight of the water-borne stain a) and is more preferably in the range of from 30 to 60 wt. %.

The kit-of parts is preferably characterized in that the water-borne stain contains one or more dyes and the organic solvent-borne stain contains one or more micronized pigments, which micronized pigments may desirably have a mean particle size (D50) of less than 1 micron.

In certain embodiments, the solvent-borne stain b) may further comprise a resin having a weight average molecular weight (Mw) in the range of 40-250 kDa. Good results have been obtained where that resin is a polyvinylbutyral (PVB) resin.

Independently of or additional to the above described embodiments, said at least one water-miscible organic solvent of the water-borne stain a) is preferably selected from the group consisting of $C_1$-$C_{12}$ alkanols, acetone, diacetone alcohol, glycol ethers and mixtures thereof.

In accordance with a further aspect of the present disclosure, there is provided a method of coloring a wooden substrate comprising the steps of:
  a) applying a water-borne stain to a surface of the wooden substrate, wherein the water-borne stain is essentially free of resin and comprises at least one water-miscible organic solvent; and thereafter
  b) applying a water-immiscible organic solvent-borne stain to said surface.

This method does not preclude the performance of an intermediate step of treatment of the wooden substrate between steps a) and b), provided that said intermediate step is not deleterious to the coloring effect of the water-borne stain. It is envisaged, in particular, that a wash-coat may be applied between the step a) of applying the water-borne stain and step b) of applying the organic solvent-borne stain.

Without wishing to be bound by theory, the preliminary application of the water-borne stain serves to "open up" the wood: it can prepare the surface for the second coloring step by mediating grain structure by, for instance, promoting a limited but controlled rupture of the substrate. The water-borne stain is permitted to dry and water-immiscible solvent-borne stain is then applied: due to the mediated wood grain structure, this solvent-borne stain easily penetrates the surface and evens out the color.

The method of this disclosure can be performed without the need to wipe the water-borne stain or the water-immiscible organic solvent-borne stain from the surface of the wooden substrate. This eliminates an energetic cost to the coloration of the substrates and obviates the need to use and then dispose of wiping materials, the disposal of which materials can be expensive and hazardous.

Definitions

As used herein, the singular forms "a", "an" and "the" include plural referents unless the context clearly dictates otherwise.

The terms "comprising", "comprises" and "comprised of" as used herein are synonymous with "including", "includes", "containing" or "contains", and are inclusive or open-ended and do not exclude additional, non-recited members, elements or method steps. If used, the phrase "consisting of" is closed and excludes all additional elements. Further, the phrase "consisting essentially of" excludes additional material elements but allows the inclusion of non-material elements that do not substantially change the nature of the invention.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

The words "preferred", "preferably", "desirably" and "particularly", and synonyms thereof, are used frequently herein to refer to embodiments of the disclosure that may afford particular benefits, under certain circumstances. However, the recitation of one or more preferable, preferred, desirable or particular embodiments does not imply that other embodiments are not useful and is not intended to exclude those other embodiments from the scope of the disclosure.

As used throughout this application, the word "may" is used in a permissive sense—that is meaning to have the potential to—rather than in the mandatory sense.

The term "stain" as used herein refers to a transparent or semi-transparent solution or dispersion of a coloring agent—selected from pigments, tinting agents, dyes and metal effect agents—in addition to adjunct materials in a vehicle. Herein, the term "stain" is further qualified as being that solution or dispersion which is actually intended to contact the substrate and is thus distinguished from concentrates of coloring agents which require dilution in advance of such application. The (semi-) transparency of the stain allows it to color the wooden substrate without hiding it or leaving an opaque film. The stain of the present disclosure will conventionally be characterized by a solids content of less than 20 wt. %.

As used herein, "water-borne stain" means a stain of which the viscosity is adjusted by the use of water and in which at least 10% by weight of the liquid continuous phase of the stain is constituted by water. The term "organic solvent-borne stain" as used herein means a stain of which the viscosity is adjusted by the use of organic solvent and in which at least 90% by weight of the liquid continuous phase of the stain is constituted by organic solvent(s).

Any water which is supplied for use as a (co-)solvent in this application should have a total dissolved solids content of less than 500 mg/L, preferably less than 250 mg/L. Tap water may be tolerated in certain circumstances but it is preferred that the water be distilled water, demineralized water, deionized water, reverse osmosis water, boiler condensate water, or ultra-filtration water.

As used herein "solvents" are substances capable of dissolving another substance to form a uniform solution; during dissolution neither the solvent nor the dissolved substance undergoes a chemical change. Solvents may either be polar or non-polar. The term "alcoholic solvent" encompasses such solvents which are any water-soluble mono-alcohols, diols or polyols that are liquids at 25° C. at atmospheric pressure.

The term "water-miscible organic solvent", as used herein, refers to an organic solvent that is completely miscible with water at room temperature. In this regard, a particular preference may be noted for organic solvents which are soluble, freely soluble or very soluble in water and are thereby characterized by requiring ≤30 ml of water to dissolve 1 g of organic solvent at room temperature.

The term "water-immiscible organic solvent", as used herein refers to organic solvents that form a two-phase system with water. In this regard, a particular preference may be noted for organic solvents which are slightly soluble, very slightly soluble or practically insoluble in water and are thereby characterized by requiring ≥100 ml of water to dissolve 1 g of organic solvent at room temperature.

The term "pigment" as used herein refers to a wood coloring compound which, when applied in a selected carrier, has a solubility of less than 5 g per 100 g carrier and preferably less than 1.0 g or less than 0.1 g per 100 g of carrier at room temperature. Furthermore, the pigment should also have a water solubility of less than 5 g per 100 g of water at room temperature, preferably less than 1.0 g or less than 0.1 g per 100 g of water.

The term "micronized" when used in reference to a pigment powder, means a powder having a particle size of from 0.001 to 50 microns, typically from 0.001 to 25 microns. The term "micronized" is intended to refer both to: particles which have been produced through finely dividing materials which are originally presented in bulk form; and, particles obtained by other mechanical, chemical or physical methods, including formation in solution with or without a seeding and comminution by one or more of pulverization, milling, grinding, homogenization and sonication.

The term "particle size" refers to the largest axis of the particle. In the case of a generally spherical particle, the largest axis is the diameter. Unless otherwise stated, the primary particulate dimensions are determined by Scanning Electron Microscopy (SEM) measurements: in this determination, the software "Analysis Pro" from Olympus Soft Imaging Solutions GmbH can be used. Volume particle size and particle size distribution are measured using the Hydro 2000G equipment available from Malvern Instruments Ltd.

The term "mean particle size" (D50), as used herein, refers to a particle size corresponding to 50% of the volume of the sampled particles being greater than and 50% of the volume of the sampled particles being smaller than the recited D50 value. Similarly, the term "D90" refers to a particle size corresponding to 90% of the volume of the sampled particles being smaller than and 10% of the volume of the sampled particles being greater than the recited D90 value.

As used herein, "curing" and like terms as used herein, refers to a process of setting or drying, for instance evaporative drying, of a material to form a coating on a substrate. Broadly, curing may be performed herein by exposure to ambient conditions or by deliberate exposure to heat or radiation.

As used herein, the term "volatile organic compound" (VOC) is defined as a carbon-containing compound that has a boiling point below 250° C. at atmospheric pressure. VOC content can be calculated based on the amount of VOC in the formulation.

As used herein, the term "dispersion" refers to a composition that contains discrete particles that are distributed throughout a continuous liquid medium.

All percentages, ratios and proportions used herein are given on a weight basis unless otherwise specified.

As used herein, room temperature is 23° C. plus or minus 2° C.

As used herein, "$C_1$-$C_n$ alkyl" group refers to a monovalent group that contains 1 to n carbons atoms, that is a radical of an alkane and includes straight-chain and branched organic groups. As such, the term "$C_{1-6}$ alkyl" as used herein refers to a linear or branched saturated hydrocarbon group containing from 1 to 6 carbon atoms. Examples of such groups include methyl, ethyl, n-propyl, isopropyl, n-butyl, isobutyl, sec-butyl, tert butyl, n-pentyl, isopentyl, neopentyl or hexyl and the like.

The term "$C_{1-12}$ alkanol" as used herein refers to compounds of the general formula ROH, where R is a $C_{1-12}$ alkyl group.

The term "anhydrous" is intended to mean herein that the applicable mixture, component or part comprises less than 0.25 wt. % of water, based on the weight of the mixture, component or part. The term "essentially free of" should be interpreted analogously as meaning the relevant composition comprises less than 0.25 wt. % of the stated element.

DETAILED DESCRIPTION OF THE INVENTION

Kit Part a): Water-Borne Stain

This part consists of a water-borne stain which is essentially free of resin and necessarily comprises at least one water-miscible organic solvent. The water and said at least one water-miscible organic solvent may be mixed at a ratio by weight of from 10:90 to 90:10, for example from 20:80 to 80:20 or from 30:70 to 70:30.

The at least one water-miscible organic solvent of the present disclosure may be selected from the group consisting of:

$C_{1-12}$, in particular $C_{1-3}$alkanols such as methanol, ethanol, n-propanol, isopropanol, tert-butanol;

diols, particularly diols having from 2 to 12 carbon atoms, more preferably from 2 to 6 such as ethylene glycol, propylene glycol, butylene glycol, 1,5-pentanediol, pentylene glycol, hexylene glycol but also including thiodiglycol and oligo- and poly-alkyleneglycols, such as diethylene glycol, triethylene glycol, dipropylene glycol, polyethylene glycol and polypropylene glycol;

triols such as 1,2,6-hexanetriol;

ketones and ketone-alcohols, such as acetone, methyl ethyl ketone, 2-pentanone, 3-pentanone, methyl isobutyl ketone, cyclohexanone and diacetone alcohol;

tetrahydrofuran;

dioxane;

mono-$C_{1-4}$-alkyl ethers of diols having from 2 to 12 carbon atoms, such as ethylene glycol mono-($C_1$-$C_4$)-alkyl ethers, propylene glycol mono-($C_1$-$C_4$)alkyl ethers and in particular ethylene glycol monomethyl ether, ethylene glycol monobutyl ether, propylene glycol monomethyl ether, propylene glycol monopropyl ether, propylene glycol monobutyl ether;

diethylene glycol mono-($C_1$-$C_4$)alkyl ethers, such as diethylene glycol monomethyl ether and diethylene monobutyl ether;

dipropylene glycol mono-($C_1$-$C_4$)alkyl ethers, such as dipropylene glycol N-propyl ether, dipropylene glycol monopropyl ether and dipropylene glycol monobutyl; propylene glycol phenyl ether;

linear amides, such as N,N-dimethylformamide and N,N-dimethylacetamide;

cyclic amides such as 2-pyrrolidone, N-methyl-2-pyrrolidone, N-ethyl-2-pyrrolidone and 1,3-dimethylimidazolidone;

sugar esters such as dimethyl isosorbide;

cyclic esters such as caprolactone; and, sulfoxides, such as dimethyl sulfoxide and sulfolane.

Said at least one water-miscible solvent is preferably selected from the acetone, diacetone alcohol, ethanol, isopropyl alcohol, glycol ethers and mixtures thereof.

The presence of water-immiscible organic solvents in this part a) is not strictly precluded but it does not represent a preferred embodiment. Rather it is preferred that said part a) is essentially free of water-immiscible organic solvents and as such presents as a single, continuous aqueous phase.

Said part a) is essentially free of resins. Preferably, no resins are present in the stain. Under resins any polymer is understood, that is, a compound with at least three repeating units with a total molecular weight of 1000 and higher. Without wishing to be bound by theory, it is believed by inventors that water-borne resins tend to seal up pores in wooden substrates. The inventors have found that a combination of water and a water-miscible organic solvent allows the pores to open without rupturing and raising the grain of the wooden substrate. This provides an open surface that will evenly take up the solvent-borne stain afterwards, maintaining visual contrast. Using a water-borne resin in part a) would be counterproductive to opening the grain.

This part a) of the kit-of-parts comprises a coloring agent in addition to the aforementioned mixture of water and at least one water-miscible organic solvent. Typically, this part a) may be defined as comprising, based on the weight of the stain: from 1 to 10 wt. % of one or more coloring agents; and, at least 80 wt. % of said mixture of water and at least one water-miscible organic solvent.

Conventionally, the water-borne stain will contain one or more dyes. For example, the water-borne stain may in preferred embodiments be characterized by containing coloring agents in an amount of from 1 to 10 wt. %, based on the weight of the stain, wherein said coloring agents consist or consist essentially of said one or more dyes. And, without intention to limit the present disclosure, it is preferred that said dyes are selected from: acid dyes; cationic dyes; reactive dyes; metal complex dyes; and, mixtures thereof.

For illustrative purposes, suitable dyes include: triphenylmethane dyes having at least two sulfonic acid groups; anthraquinone dyes, in particular 1-amino-4-arylaminoanthraquinone-2-sulfonic acids and 1,4-diarylamino- or 1-cycloalkylamino-4-arylaminoanthraquinonesulfonic acids; heavy-metal-free mono- and bisazo dyes, each having one or more sulfonic acid groups; and, heavy-metal-containing monoazo, bisazo, azomethine and formazan dyes. Having regard to the final category, a preference may be mentioned for: i) dyes containing copper (Cu), chromium (Cr), nickel (Ni) or cobalt (Co); and, independently or additionally, ii) metalized dyes having either two molecules of azo dye or one molecule of azo dye and one molecule of azomethine dye as ligands to a metal atom.

The cationic dyes which can be used may belong to a very wide variety of classes of dye. For illustrative purposes, suitable dyes include cationic monoazo, anthraquinone and oxazine dyes.

Metal complex dyes are to be understood as meaning, for example, the metal-containing acid dyes described above under acid dyes, and also 1:1 or 1:2-metal complex dyes which do not have water-solubilizing groups, in particular do not have sulfo groups. Of the metal complex dyes, particular importance is given to the copper and cobalt complexes of azo, quinine, oxime and hydroxyanthraquinone dyes.

Illustrative examples of reactive dyes are dyes from the group of the monoazo, disazo, polyazo, metal complex azo, anthraquinone, phthalocyanine, formazan or dioxazine dyes which contain at least one reactive group and, preferably, at least one sulfo group. Said reactive groups must be able to react with the hydroxyl groups of cellulose to form chemical covalent bonds and are usually joined to the dye radical directly or via a bridging atom or group.

The aqueous stains of part a) of the kit are formulated by simple mixing of the dye(s), water, miscible organic solvent(s) and, if applicable, adjunct and additive ingredients: the mixing conditions should ensure the complete dissolution of the dye(s). If necessary, this aqueous stain may be prepared well in advance of its application. However, in an interesting alternative embodiment, a concentrated stain ($a^{conc}$) may first be obtained by mixing components with only a fraction of the water that would be present in the stain as applied: the concentrated stain ($a^{conc}$) may then be diluted with the remaining water shortly before its application. It is considered that such concentrated stains ($a^{conc}$) may be prepared and stored as either single-package concentrates—that can be converted by dilution with water only—or as multi-part concentrates, two or more of which must be combined and diluted to form a complete working composition according to the present disclosure. Any dilution can be effected simply by the addition of water under mixing. The stain might equally be prepared within a rinse stream whereby one or more streams of the concentrate(s) is injected into a continuous stream of water.

Any dissolution of the dyes to form the stain per se or to form the concentrated stain ($a^{conc}$) may, of course, be facilitated by raising the temperature of the solvent mixture, whilst being mindful that the temperature should be below the boiling point of that solvent mixture. Having regard to the typical and preferred water-miscible organic solvents of which the first stain may be comprised, the dissolution step may be performed at a temperature in the range of from 30° C. to 80° C.: the solution thus formed may be maintained within this temperature range for subsequent application.

Kit Part b): Water-Immiscible Organic Solvent-Borne Stain

This part b) of the kit-of-parts is a water-immiscible organic solvent-borne stain. Typically this part may be defined as comprising, based on the weight of the stain: from 1 to 10 wt. % of one or more coloring agents; and, at least 80 wt. % of one or more water-immiscible organic solvents. These compositional ranges allow for the presence of adjunct ingredients such as resins. However, it is noted that the water-immiscible solvent based stain should be anhydrous.

Whilst the water-immiscible organic solvent-borne stain may contain other coloring agents, it is preferred that it contains one or more micronized pigments. Indeed, in a preferred embodiment, the coloring agents present in the organic solvent-borne stain consist or consist essentially of said one or more micronized pigments. For example, the water-immiscible organic solvent-borne stain may in preferred embodiments be characterized by containing coloring agents in an amount of from 1 to 10 wt. %, based on the weight of the stain, wherein said coloring agents consist or consist essentially of said one or more micronized pigments.

The pigments present should desirably be characterized by a mean particle size (D50) of less than 5 microns. More preferably, the pigments should be characterized by at least one the following conditions:
  i) a mean particle size (D50) of the micronized pigment is less than 1 micron; and,
  ii) a D90 particle size of less than 5 microns, in particular less than 2 microns.

The pigments which can be used in the compositions include inorganic and organic pigments. Inorganic pigments include compounds of metals such as iron, zinc, titanium, lead, bismuth, chromium, copper, cadmium, calcium, zirconium, cobalt, magnesium, aluminum, nickel and other transition metals. Carbon black and graphite are considered herein as inorganic pigments having utility in the present disclosure.

Illustrative but non-limiting examples of suitable inorganic pigments are: iron oxides, including red iron oxides, yellow iron oxides, black iron oxides and brown iron oxides; carbon black; iron hydroxide; graphite; black micaceous iron oxide; aluminum flake pigments; pearlescent pigments; calcium carbonate; calcium phosphate; calcium oxide; calcium hydroxide; bismuth oxide; bismuth hydroxide; bismuth carbonate; copper carbonate; copper hydroxide; basic copper carbonate; cupric oxide; cuprous oxide; silicon oxide; zinc carbonate; barium carbonate; barium hydroxide; strontium carbonate; zinc oxide; zinc phosphate; zinc chromate; barium chromate; chrome oxide; titanium dioxide; zinc sulfide; antimony oxide; and lead chrome.

As preferred inorganic pigments may be mentioned: carbon black; graphite; iron oxides, including yellow, red, black and brown iron oxides; zinc oxide; titanium oxide; $Al_2O_3$; and, $Al(OH)_3$.

Illustrative but non-limiting examples of organic pigments are: monoazo (arylide) pigments, such as PY3, PY65, PY73, PY74, PY97 and PY98; disazo (diarylide) pigments; disazo condensation products; benzimidazolone; β-naphthol; naphthol; metal-organic complexes; isoindoline; isoindolinone; quinacridone; perylene; perinone; anthraquinone; diketo-pyrrolo pyrrole; dioxazine; triacrylcarbonium; phthalocyanine pigments, such as cobalt phthalocyanine, copper phthalocyanine, copper semichloro- or monochlorophthalocyanine, copper phthalocyanine, metal-free phthalocyanine, copper polychlorophthalocyanine, phthalocyanine blue; organic azo compounds; organic nitro compounds; polycyclic compounds, such as phthalocyanine pigments, quinacridone pigments, perylene and perinone pigments; diketopyrrolo-pyrrole (DPP) pigments; thioindigo pigments; dioxazine pigments; quinophthalone pigments; triacrylcarbonium pigments; and, diaryl pyrrolopyroles, such as PR254.

Further illustrative but non-limiting examples of organic pigments may be grouped according to the color they produce and may thereby include, based on their color index: Pigment Yellows (PY) 1, 11, 3, 12, 13, 14, 17, 81, 83, 65, 73, 74, 75, 97, 111, 120, 151, 154, 175, 181, 194, 93, 94, 95, 128, 166, 129, 153, 109, 110, 173, 139, 185, 138, 108, 24; Pigment Oranges (PO) 5, 36, 60, 62, 65, 68, 61, 38, 69, 31, 13, 34, 43, 51, 71, 73; Pigment Reds (PR) 3, 4, 171, 175, 176, 185, 208, 2, 5, 12, 23, 112, 146, 170, 48, 57, 60, 68, 144, 166, 214, 220, 221, 242, 122, 192, 202, 207, 209, 123, 149, 178, 179, 190, 224, 177, 168, 216, 226, 254, 255, 264, 270, 272; Pigment Violets (PV) 32, 19, 29, 23, 37; Pigment Browns 25, 23; Pigment Blacks 1, 31, 32, 20; Pigment Blues (PB) 15, 15:1, 15:2, 15:3, 15:4, 15:6, 16, 60; and, Pigment Greens (PG) 7, 36.

As noted, the carrier of this part of the staining system comprises a water-immiscible organic solvent. Exemplary water-immiscible organic solvents include: aliphatic and cycloaliphatic hydrocarbons, such as butane, pentane, hexane, cyclohexane and heptane; aromatic hydrocarbons, such as toluene, xylene, naphthalene, tetrahydronaphthalene and methyl naphthalene; chlorinated aromatic hydrocarbons, such as chlorobenzene, fluorobenzene, chloronaphthalene and bromonaphthalene; esters, such as butyl acetate, ethyl acetate, butoxyethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di(2-ethylhexyl) phthalate; organic carbonate solvents, such as propylene carbonate, ethylene carbonate, dimethyl carbonate, ethyl methyl carbonate and diethyl carbonate; alcohols having six or more carbon atoms, such as hexanol, octanol, benzyl alcohol, phenyl ethanol, phenoxy ethanol, phenoxy propanol and phenoxy butanol; ethers having at least 5 carbon atoms, preferably $C_{5-14}$ ethers such as anisole and phenetole; nitrocellulose; cellulose ether; cellulose acetate; low odor petroleum distillates; turpentine; white spirits; naphtha; isopropylbiphenyl; terpene; vegetable oil; mineral oil; essential oil; natural oil; and mixtures of any two or more thereof.

The use of one or more esters as water-immiscible organic solvent(s) may be mentioned as a preferred embodiment.

Whilst not essential to the present disclosure, the water-immiscible organic solvent-borne stain b) may further comprise a resin to improve the adhesion of the pigment particles to wood, to improve the adhesion of subsequent coating layers and to improve inter alia the resistance of the pigment treated wood to color change over time due to oxidation and/or exposure to visible and ultraviolet radiation. Added resin should be preferably be characterized by a weight average molecular weight (Mw) in the range of from 20 to 500 kDa, in particular from 40 to 250 kDa. Molecular weight can be determined by gel permeation chromatography GPC with polystyrene as the standard and tetrahydrofuran as the mobile phase. Independent of or additional to this characterization, the ratio by weight of the resin to the coloring agent in part b) should be in the range from 0.001:1 to 10:1, in particular from 0.05:1 to 1:1.

Exemplary categories of resinous binder include but are not limited to: polyurethane; polyester; polyesteramide; polyvinyl alcohol; polyamide; epoxy resins; acrylic polymers; vinyl polymers, including polymers made from ethylenically unsaturated monomers such as polybutene; silicone resins, including polyorganosiloxanes; silicate resins; alkyd resins; cellulosic resins; non-cellulosic polysaccharide resins; and, natural oligomers and polymers.

The following list is provided of representative resins within the stated categories:

i) Vinyl based resins: exemplary resins include polyethylene, polypropylene, polyvinyl chloride, polyvinyl alcohol, polystyrene, poly α-methyl styrene, polyvinyl acetate, polymethyl methacrylate, poly(vinyl butyral), polyacrylonitrile, polyvinyl ethyl ether and polyvinylidene fluoride.

ii) Acrylic resins: exemplary resins include poly(meth) acrylic acid, polyethyl acrylate, polymethyl methacrylate, polylauryl methacrylate, poly2-hydroxyethyl acrylate, polyglycidal methacrylate, polyacrylamide, polyhexanediol diacrylate, polytrimethylol propane triacrylate and polycarboxylic acid.

iii) Hydrocarbon resins and bituminous binders: exemplary resins include petroleum oil-derived hydrocarbon resins, terpene resins, ketone resins, asphaltite, petroleum asphalts, bituminous mastics and asphaltic hybrids.

iv) Cellulosic resins: examples include nitrocellulose, cellulose acetate, cellulose acetate butyrate, ethylcellulose, carboxylmethyl cellulose, methyl cellulose, ethyl cellulose, hydroxyethyl cellulose, hydroxypropyl cellulose and methyl hydroxyethyl cellulose.

v) Polysaccharide resins such as those available from Larama Polysaccharide Resins.

vi) Vegetable oils, modified vegetable oils and natural oils: examples include castor oil, linseed oil, tung oil, soya oil, tall oil, safflower oil and fish oil.

vii) Alkyd resins: exemplary resins include polyabietic acid and polyamide-modified alkyds.

viii) Phenolic resins: exemplary resins include phenolic novolacs, phenolic resoles, phenolic epoxies and phenolic modified rosins.

ix) Amino resins: examples include urea formaldehyde resins, melamine formaldehyde resins and hexamethoxymethyl melamine resins.

x) Epoxy resins: examples include bisphenol A based epoxy resins, bisphenol F epoxy resins, polyglycol epoxy resins, cardanol-based epoxies and brominated epoxies.

Whilst it is not usually necessary do so, surface active agents may be utilized—in an amount of from 0 to 15 wt. %, preferably 0 to 8 wt. % and more preferably 0 to 5 wt. % based on the total weight of the resin—to assist in the dispersion of the resin in the organic solvents, even if the (co-)polymer is self-dispersible.

Preferred surface active agents include: fatty alcohols, ethoxylated fatty acids, fatty amides and/or Na-, K- and $NH_4$-salts of fatty acids. Other useful anionic surface active agents include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Useful cationic surface active agents include alkyl or (alk)aryl groups linked to quaternary ammonium salt groups. Non-ionic surface active agents include polyalkyleneglycol compounds and copolymers thereof and, preferably, polyethylene oxide compounds.

To form the water-immiscible organic solvent borne stain, the solvent, coloring agent and further components are added and mixed together. Where that coloring agent is a pigment, as disclosed in the preferred embodiments of this part, the mixture should be exposed to sufficient mechanical agitation—sufficient kinetic energy—to facilitate wetting of the powder within the liquid and the homogeneous dispersion therein of the particles. Examples of such mechanical agitation include but are not limited to: milling, including the use of ball mills and media mills; homogenizing; mixing; stirring; shearing; shaking; or, blending. Other examples include sonication and vortexing.

If necessary, this stain may be prepared well in advance of its application. However, in an interesting alternative embodiment, a concentrated stain ($b^{conc}$) may first be obtained by mixing components with only a fraction of the solvent that would be present in the stain as applied: the concentrated stain ($b^{conc}$), which could in certain circumstance be pasteous, may then be diluted with the remaining solvent shortly before its application. It is considered that such concentrated stains ($b^{conc}$) may be prepared and stored as either single-package concentrates—that can be converted by dilution with solvent only—or as multi-part concentrates, two or more of which must be combined and diluted to form a complete working composition according to the invention. Any dilution can be effected simply by the further addition of solvent under mechanical sufficient agitation to achieve or maintain a homogeneous dispersion of particles.

Additives and Adjunct Ingredients to Part a) and/or Part b)

The staining compositions (Parts a) and b) hereinabove) will typically further comprise adjuvants and additives, which are necessarily minor components but which can nevertheless impart improved properties to these compositions. Included among such adjuvants and additives—which independently of one another may be included in a single part or both parts of the staining system—are: non-pigmentary fillers; extenders; wetting agents; anti-foaming and/or defoaming agents; UV absorbers, such as 2-hydroxybenzophenone, 2-hydroxy-1,3,5-triazine and N,N'-Diphenyloxamide; fungicides; bactericides; and/or, insecticides.

For completeness, where the water-borne stain comprises reactive dyes as described above, adjunct materials and additives which contain reactive groups will not be blended in that part of the staining system. Unreactive materials may be formulated into either or both of the parts a) and b).

The total amount of adjunct materials in the compositions of part a) and part b) of the present disclosure will preferably be up to 10 wt. %, and more preferably from 0.1 to 5 wt. % or from 0.1 to 2 wt. % based on the total weight of each part.

Optional Wash Coating Composition

As noted hereinabove, a wash coat may be utilized in the staining system of the present disclosure. As would be recognized by the skilled artisan, such a wash coat may have a plurality of functions including, but not limited to: sealing in the colorant provided by the water-borne stain; providing the perception of depth in the final appearance of the wooden substrate; and, forming a physical barrier that prevents over-absorption of a subsequently applied stain to areas of the wooden substrate that are prone to such over absorption. The wash coat delivers a thin layer of resinous material to the surface of the wood: the layer should not completely fill the pores of the wood as this would preclude the ingress of the coloring agents—in particular pigments—provided by the water-immiscible organic solvent-borne stain.

The wash coating compositions typically will be essentially free of coloring agents but may, in some circumstances, contain colorants in order to impart a particular coloring or depth effect. The wash coating compositions comprise a resinous binder dispersed or dissolved in a suitable carrier. Without intention to limit the present disclosure, exemplary categories of resinous binder include but are not limited to: polyurethane; polyester; polyesteramide; polyvinyl alcohol; polyamide; epoxy resins; acrylic polymers; vinyl polymers, including polymers made from ethylenically unsaturated monomers such as polybutene; silicone resins, including polyorganosiloxanes; silicate resins; alkyd resins; cellulosic and other polysaccharide resins; and, natural oligomers and polymers.

Methods and Applications

The two-part staining system described above enables a method of coloring a wooden substrate which comprises the steps of: a) applying a water-borne stain to a surface of the wooden substrate, wherein the water-borne stain is essentially free of resin and comprises at least one water-miscible organic solvent; and thereafter, b) applying a water-immiscible organic solvent-borne stain to said surface. As also noted, a wash-coat layer may be applied between the step a) of applying the water-borne stain and step b) of applying the organic solvent-borne stain.

It is envisaged that the two-part staining system of the present disclosure can be used to treat all types of wood. Common commercial woods which can be treated include but are not limited to: alder; pine; basswood; spruce; hemlock; hickory; fir; cherry; oak; ash; beech; maple; walnut; pear; teak; mahogany; chestnut; birch; larch; hazelnut; lime; willow; poplar; elm; Scots pine; plane; obeche; and, aspen. The system may also be used to treat more obscure woods such as epe, ebony, ironwood or hornbeam.

It is also noted that the two-part staining system may be used to treat: unfilled composite wood structures; filled composite wood structures, such as composite structures including a sheet of processed, often fibrous material between sheets of wood veneer; manufactured wood structures, such as manufactured doors; and, re-manufactured wood structures.

The actual wooden substrate to be coated may be of any form known in the art, including for example unedged timber, flitches, boules, half-edged boards, square-edged lumber, strips, squares, carcassing, truss beams, scantlings and tongue-and-groove flooring, such as parquet, decking (E2E or E4E), and anti-slip decking (1 or 2 sides). The stains of the present disclosure may be applied to fully cover said substrates or to cover only parts thereof, including edges, curvilinear surfaces, routered and beveled areas.

The particular wood surface to be stained may be cleaned and prepared for application of the disclosed staining system using methods—such as sanding, texturing, wetting and bleaching—that will be familiar to those skilled in the art. For completeness, it is not precluded that one or more cleaning process may be required to remove dirt or dust from the surface of the wooden substrate immediately after the application of the water-borne stain a) thereto and/or immediately after the application of the wash coat thereto and prior to the application of the water-immiscible solvent based stain b).

Each staining composition may be applied to the substrate surface by conventional application methods, including but not limited to: flooding; dipping; brushing; roll coating; doctor-blade application; printing methods; air-atomized spray; air-assisted spray; airless spray; high volume low pressure spray; low volume low pressure spray; low volume medium pressure spray; air-assisted airless spray; and, high-speed rotation bell.

In the conventional method of stain application—known as "flood and wipe"—the compositions would be applied liberally but be wiped off immediately to allow the wood itself to determine how much stain gets absorbed. Flood and wipe can ensure that there is no excess layer of stain atop the wood after absorption which extends curing times and, for some stains, can also cause the finishes to delaminate, turn hazy or chip off easily.

It has been found that the staining system can be applied—and achieve consistent and predictable staining—without the need to immediately wipe the stain from the substrate surface.

Each staining composition and, where applicable, the wash-coat is preferably applied in an amount sufficient to provide good wet coat coverage of the substrate surface and, again where applicable, a continuous cured coating.

It is recommended that the given coating compositions be applied to a wet film thickness of from 0.02 to 0.1 mm (1 to 4 mils). The application of thinner layers within this range can be more economical but great control must be exercised in applying thinner coatings so as to avoid either discontinuous staining or the formation of discontinuous cured films. Conversely, a thicker coating application can take significantly longer to cure and can in certain circumstances result in delamination, hazing or chipping.

Once applied each staining composition and, if applicable, the wash coating composition is allowed to cure. Said curing may be constituted by allowing the applied compositions to dry under ambient conditions. However, it is preferred that compositions are actively cured: the skilled artisan will be aware of suitable techniques for accelerating the curing process and can determine suitable curing conditions empirically based on the particular application equipment, the wood species employed and the ambient temperature. In general, active curing may be effected by elevating the temperature of the applied composition above the mixing temperature and/or the application temperature of the stain using conventional means, including microwave induction. Curing temperatures above 100° C. may not be advantageous as they could be deleterious to the structure of the wooden substrate and also impose a requirement to substantially heat or cool the applied compositions from the usually prevailing ambient temperature.

The present disclosure does not preclude supplementary coating layers being applied to that coating layer formed by curing of the water-immiscible organic solvent-borne stain. As will be understood by the skilled artisan, light sanding, denibbing or other facilitative surface pre-treatments might be performed after the cure of that stain layer and prior to the application of such supplementary layers. That aside, supplementary coatings should desirably be characterized both by adequate adhesion to the cured or dried stain layer and by having physical properties such that the expansion, contraction or other conformational change—upon drying or curing, or with changes in pressure, temperature, humidity or the like—would not induce stress in the coating system as a whole or in the substrate.

The following examples are illustrative of the present disclosure and are not intended to limit the scope of the invention in any way.

EXAMPLES

Example 1

A stain system was formulated as follows:
a) The first, water-borne pre-stain was obtained by adding 3 parts per hundred of chromium complex dyes to a 65:35 blend of acetone:water by weight.
b) The second water-immiscible organic solvent-borne stain was obtained by blending, based on the weight of said second stain: i) 78 wt. % of a mixture of aliphatic acetate esters; ii) 15 wt. % of glycol ethers; iii) 5 wt. % of an aromatic solvent blend; and, iv) 2 wt. % of a pigment dispersion in a polyvinyl butyral carrier.

The first, water-borne pre-stain was applied directly onto well-sanded and cleaned wood substrate via conventional spray application. The substrate was then dried for 10 minutes at 90° F. (32.2° C.) to form a first stain layer. Subsequent to the drying step, the second stain was applied to the wood substrate via conventional spray application, allowed to flash for 3 minutes and then cured for 3 minutes at 120° F. (48.9° C.).

Example 2

A stain system was formulated as follows:
a) The first, water-borne pre-stain was obtained by adding 4.5 parts per hundred of chromium complex dyes to a 55:40:5 blend of acetone:water:diacetone alcohol by weight.
b) The second water-immiscible organic solvent-borne stain was obtained by blending, based on the weight of said second stain: i) 78 wt. % of a mixture of aliphatic acetate esters; ii) 14 wt. % of butoxyethyl acetate; iii) 5 wt. % of an aromatic solvent blend; and, iv) 3 wt. % of a pigment dispersion in a polyvinyl butyral carrier.

The first water-borne pre-stain was applied directly onto well-sanded and cleaned wood substrate via conventional spray application. The substrate was allowed to flash for 3 minutes. Subsequently, the second stain was applied to the wood substrate via conventional spray application and cured for 5 minutes at 120° F. (48.9° C.).

Example 3

A stain system was formulated as follows:
a) The first, water-borne pre-stain was obtained by adding 4.5 parts per hundred of chromium complex dyes to a 50:50 blend of acetone:water by weight.
b) A washcoat layer was obtained by dispersing poly vinyl butyral resin (8 wt %, based on the weight of the coating composition) in a 50:35:15 blend of aliphatic acetate esters:dimethyl carbonate:2-butoxyethyl acetate by weight.

c) The second water-immiscible organic solvent-borne stain was obtained by blending, based on the weight of said second stain: i) 42 wt. % of a mixture of aliphatic acetate esters; ii) 37 wt. % dimethyl carbonate; iii) 13 wt. % of butoxyethyl acetate; iii) 5 wt. % of an aromatic solvent blend; and, iv) 3 wt. % of a pigment dispersion in a polyvinyl butyral carrier.

The first water-borne pre-stain was applied directly onto well-sanded and cleaned wood substrate via conventional spray application. The substrate was allowed to flash for 3 minutes. The washcoat formulation was then directly applied and cured for 2 minutes at 140° F. (60° C.). Subsequently, the second stain was applied to the wood substrate via conventional spray application and cured for 2 minutes at 140° F. (60° C.).

In view of the foregoing description and examples, it will be apparent to those skilled in the art that equivalent modifications thereof can be made without departing from the scope of the claims.

The invention claimed is:

1. A kit of parts comprising:
   in one part a) a water-borne stain comprising a mixture of water and at least one water-miscible organic solvent; and,
   in another part b) a water-immiscible organic solvent-borne stain,
   wherein the water-borne stain a) is essentially free of resin.

2. The kit of parts according to claim 1, wherein the water-borne stain contains one or more dyes and the organic solvent-borne stain contains one or more micronized pigments.

3. The kit of parts according to claim 2, wherein the mean particle size (D50) of the one or more micronized pigments is less than 1 micron.

4. The kit of parts according to claim 1, wherein the water-borne stain a) comprises, based on the weight of the water-borne stain a):
   from 1 to 10 wt. % of one or more coloring agents; and
   at least 80 wt. % of said mixture of water and at least one water-miscible organic solvent.

5. The kit of parts according to claim 1, wherein the water-borne stain a) comprises coloring agents in an amount of from 1 to 10 wt. %, based on the weight of the water-borne stain a), and wherein the coloring agents consist essentially of one or more dyes.

6. The kit of parts according to claim 1, wherein the water-immiscible organic solvent-borne stain b) comprises, based on the weight of the water-immiscible organic solvent-borne stain b):
   from 1 to 10 wt. % of one or more coloring agents; and
   at least 80 wt. % of one or more water-immiscible organic solvents.

7. The kit of parts according to claim 1, wherein the water-immiscible organic solvent-borne stain b) comprises coloring agents in an amount of from 1 to 10 wt. %, based on the weight of the water-immiscible organic solvent-borne stain b), wherein the coloring agents consist essentially of one or more micronized pigments.

8. The kit of parts according to claim 1, wherein the water-immiscible organic solvent-borne stain b) is anhydrous.

9. The kit of parts according to claim 1, wherein the water-immiscible organic solvent-borne stain b) comprises a resin having a weight average molecular weight (Mw) in the range of 40-250 kDa.

10. The kit of parts according to claim 9, wherein the resin is a polyvinylbutyral.

11. The kit of parts according to claim 1, wherein the at least one water-miscible organic solvent is selected from the group consisting of $C_1$-$C_{12}$ alkanols, acetone, diacetone alcohol, glycol ethers and mixtures thereof.

12. The kit of parts according to claim 1, wherein the amount of water-miscible organic solvent is in the range of 20 to 80 wt. %, based on the weight of the water-borne stain a).

13. A method of coloring a wooden substrate comprising the steps of:
   a) applying a water-borne stain to a surface of the wooden substrate, wherein the water-borne stain is essentially free of resin and comprises at least one water-miscible organic solvent; and thereafter
   b) applying a water-immiscible organic solvent-borne stain to said surface.

14. The method according to claim 13, wherein a washcoat is applied between the step a) of applying the water-borne stain and step b) of applying the water-immiscible organic solvent-borne stain.

15. The method according to claim 13, wherein no wiping takes place.

* * * * *